(12) United States Patent
Tolzin (10) Patent No.: US 6,607,342 B1
(45) Date of Patent: Aug. 19, 2003

(54) BALE TRANSPORTING APPARATUS

(76) Inventor: Michael W. Tolzin, 20874 445th Ave., Lake Preston, SD (US) 57249

( * ) Notice: Subject to any disclaimer, the term of this patent is extended or adjusted under 35 U.S.C. 154(b) by 0 days.

(21) Appl. No.: 10/034,674

(22) Filed: Dec. 28, 2001

(51) Int. Cl.[7] .............................................. A01D 90/08
(52) U.S. Cl. ........................ 414/111; 414/24.5; 414/481
(58) Field of Search ................................ 414/24.5, 24.6, 414/111, 469, 480, 481

(56) References Cited

U.S. PATENT DOCUMENTS

| | | | |
|---|---|---|---|
| 3,497,232 A | * | 2/1970 | Richey .................... 414/481 X |
| 4,019,643 A | * | 4/1977 | Kampman et al. .......... 414/481 |
| 4,103,794 A | | 8/1978 | Shaw |
| 4,268,199 A | | 5/1981 | Fontrier |
| 4,318,656 A | * | 3/1982 | Ezell ..................... 414/481 X |
| 4,376,607 A | | 3/1983 | Gibson |
| 4,718,806 A | | 1/1988 | Chambers |
| 5,496,144 A | | 3/1996 | Wetz |
| 5,664,923 A | | 9/1997 | Olin |
| 6,053,685 A | | 4/2000 | Tomchak |
| 6,240,712 B1 | | 6/2001 | Meijer |

FOREIGN PATENT DOCUMENTS

| | | | | |
|---|---|---|---|---|
| DE | 31 51 517 | * | 7/1983 | ................ 414/24.5 |
| EP | 0424 192 | * | 4/1991 | ................ 414/24.5 |

* cited by examiner

Primary Examiner—Janice L. Krizek
(74) Attorney, Agent, or Firm—Kaardal & Leonard, LLP (57) ABSTRACT

A bale transporting apparatus includes a frame, and ground engaging apparatus mounted on the frame for supporting the frame above a ground surface and permitting movement of the frame across the ground surface. A bed assembly holds collected bales thereon and includes a bed being mounted on the frame. A bale unloading assembly unloads bales from the bed; and a bale loading assembly loads a bale onto the bed. A hitch assembly may be collapsible for permitting a portion of the hitch assembly to lie substantially flat on the ground surface in a collapsed position.

20 Claims, 6 Drawing Sheets

BALE TRANSPORTING APPARATUS

BACKGROUND OF THE INVENTION

1. Field of the Invention

The present invention relates to bale handling devices and more particularly pertains to a new bale transporting apparatus for providing a simple and economical system for loading and transporting bales directly from a baler apparatus and unloading a plurality of the bales in a simple operation.

2. Description of the Prior Art

The use of bale handling devices is known in the prior art. Relatively few of the known bale handling devices are capable of directly receiving bales as the bales are discharged from a baler apparatus, particularly because the relatively low discharge height of the baler apparatus requires that the bale handling apparatus be equipped with some type of mechanism for raising the discharged bales up onto a carrying surface. Some of the bale handling devices incorporate low slung apparatus that have relatively limited ground clearance, which can pose a problem when moving over agricultural land surfaces with a high degree of contours that can interfere with the travel of the apparatus if a portion of the apparatus strikes the ground surface during movement over the ground surface. Further, some of the known apparatus' employ relatively complex structures for moving the bales, which can contribute to significant purchase costs for the apparatus, and can make the apparatus more difficult to maintain in the field.

The bale transporting apparatus according to the present invention substantially departs from the conventional concepts and designs of the prior art, and in so doing provides an apparatus primarily developed for the purpose of providing a simple and economical system for loading and transporting bales directly from a baler apparatus and unloading a plurality of the bales in a simple operation.

SUMMARY OF THE INVENTION

In view of the foregoing disadvantages inherent in the known types of bale handling devices now present in the prior art, the present invention provides a new bale transporting apparatus wherein the same can be utilized for providing a simple and economical system for loading and transporting bales directly from a baler apparatus and unloading a plurality of the bales in a simple operation.

To attain this, the present invention generally comprises a frame, and ground engaging apparatus mounted on the frame for supporting the frame above a ground surface and permitting movement of the frame across the ground surface. A bed assembly holds collected bales thereon and includes a bed being mounted on the frame. A bale unloading assembly unloads bales from the bed; and a bale loading assembly loads a bale onto the bed. A hitch assembly may be collapsible for permitting a portion of the hitch assembly to lie substantially flat on the ground surface in a collapsed position.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

The objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DETAILED DESCRIPTION OF PREFERRED EMBODIMENTS

Figure 1:
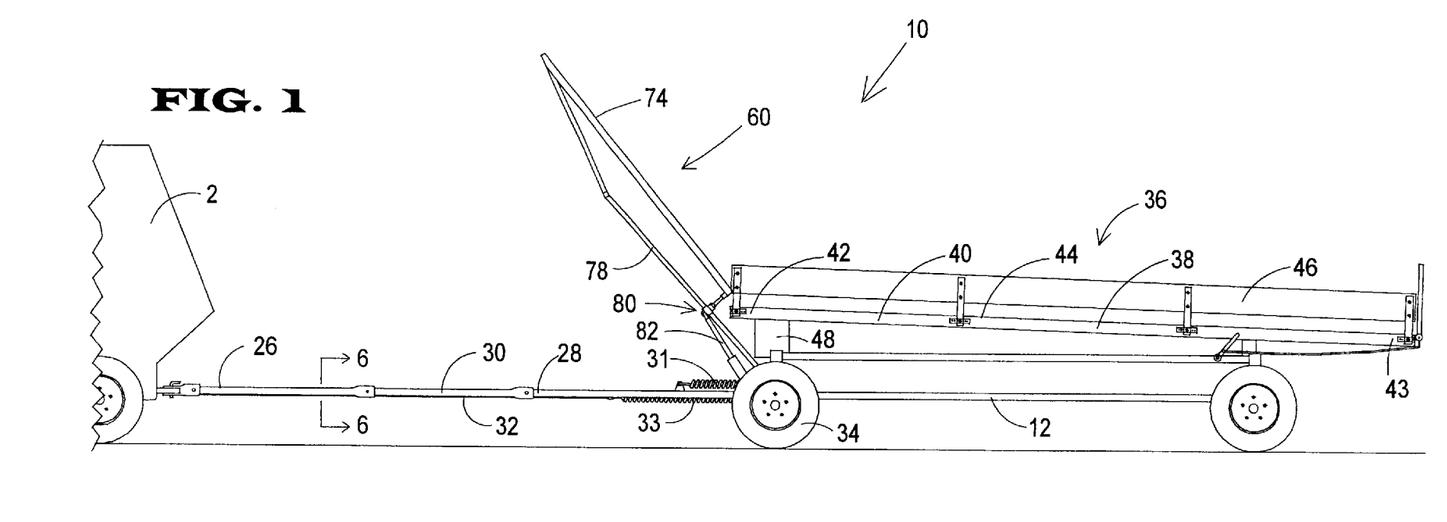
FIG. 1 is a schematic side view of a new bale transporting apparatus according to the present invention.
Figure 2:
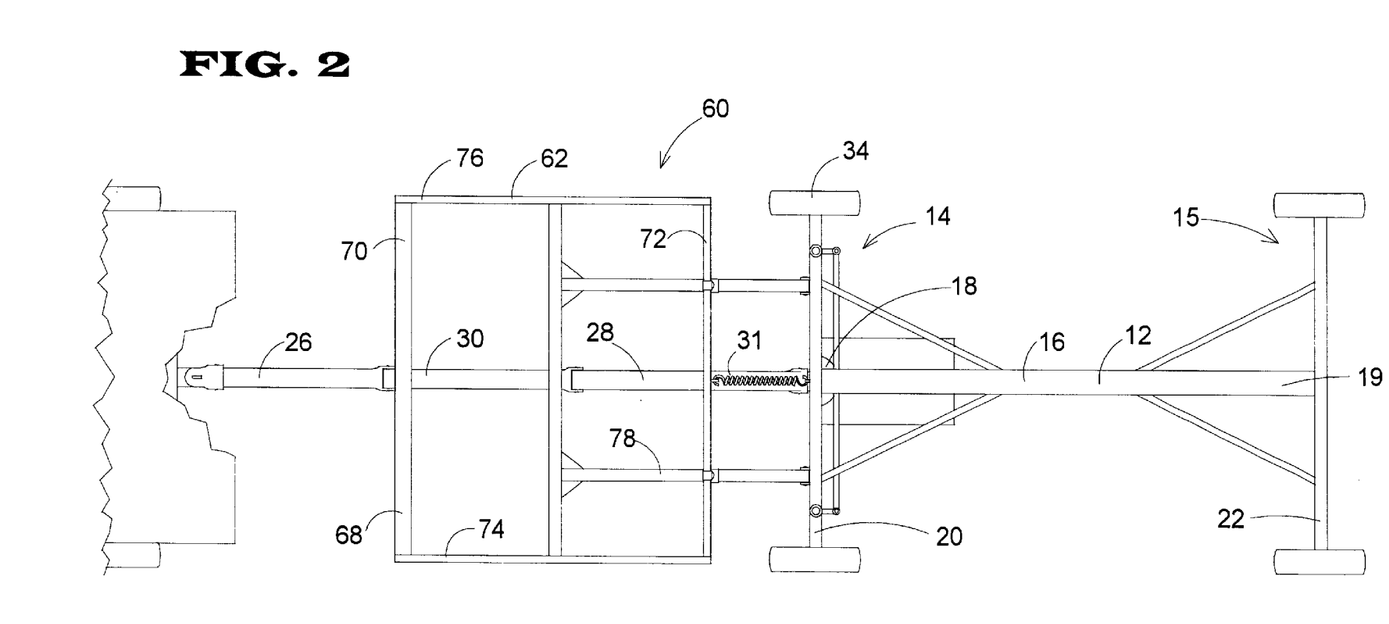
FIG. 2 is a schematic top view of the present invention with the bed assembly shown removed to reveal details of the frame and bale loading assembly.
Figure 3:
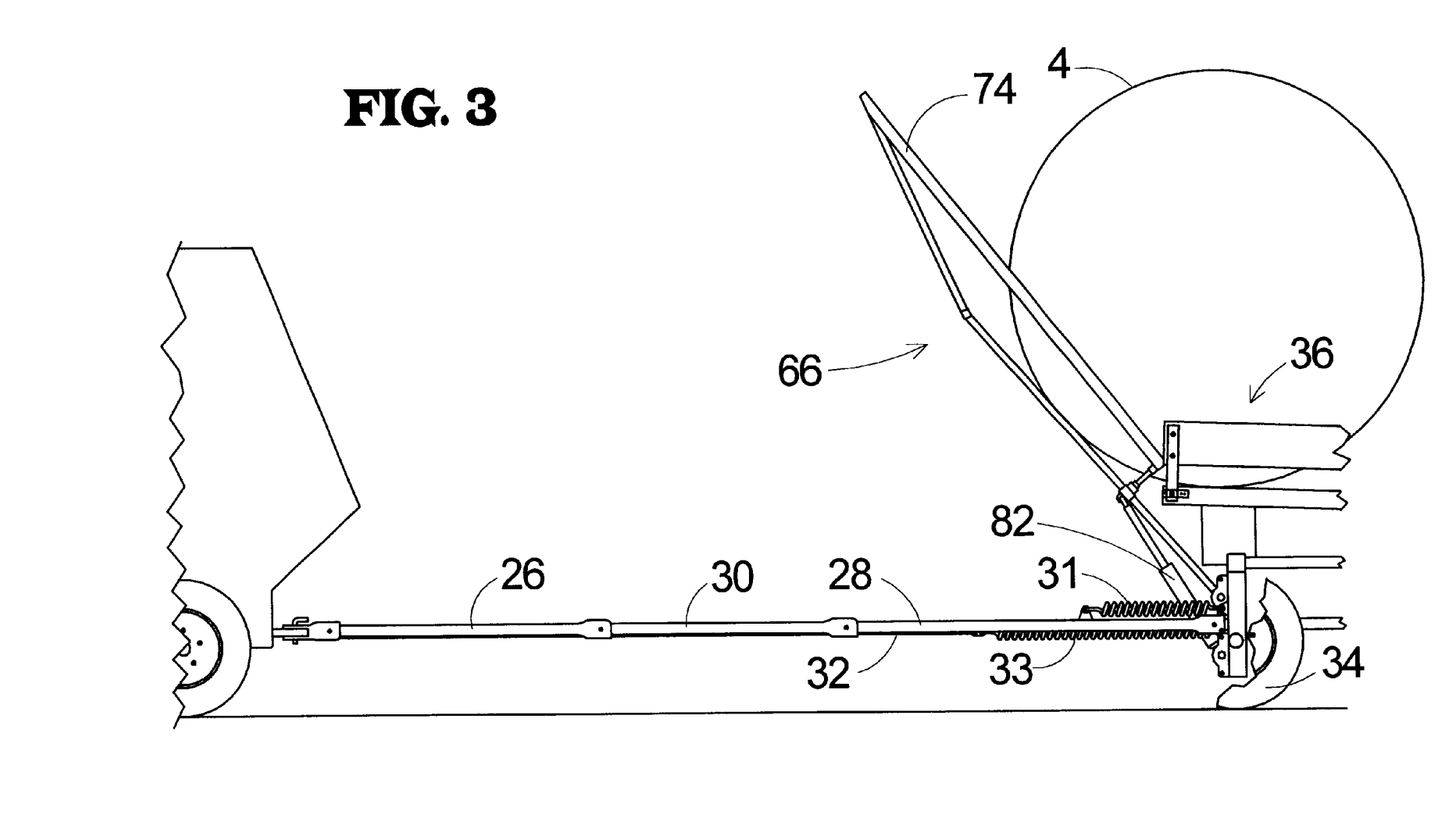
FIG. 3 is a schematic side view of a forward portion of the present invention showing the bale loading assembly in the raised position and the hitch assembly in the raised position.
Figure 4:
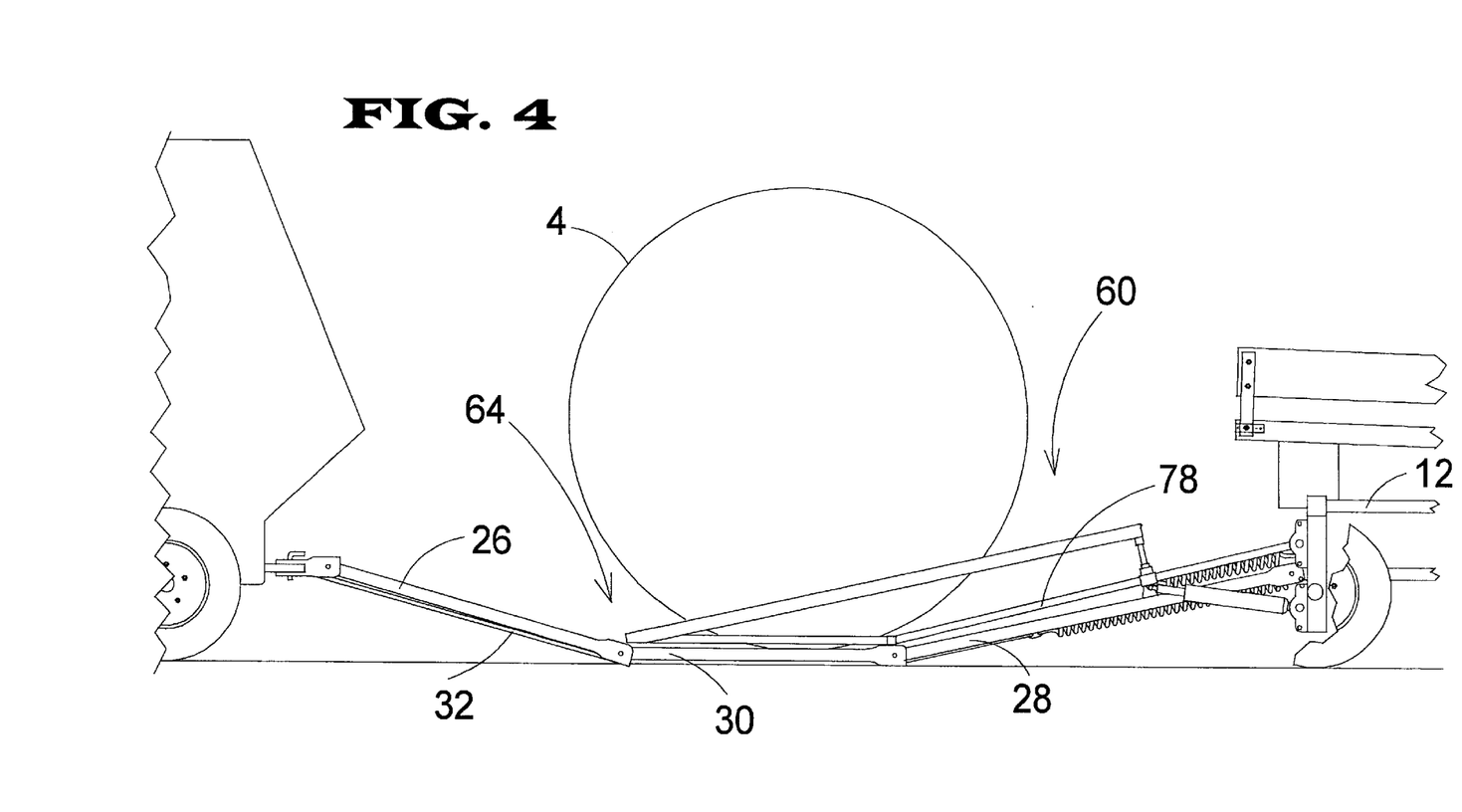
FIG. 4 is a schematic side view of the forward portion of the present invention showing the bale loading assembly in the lowered position and the hitch assembly in the dropped position.
Figure 5:
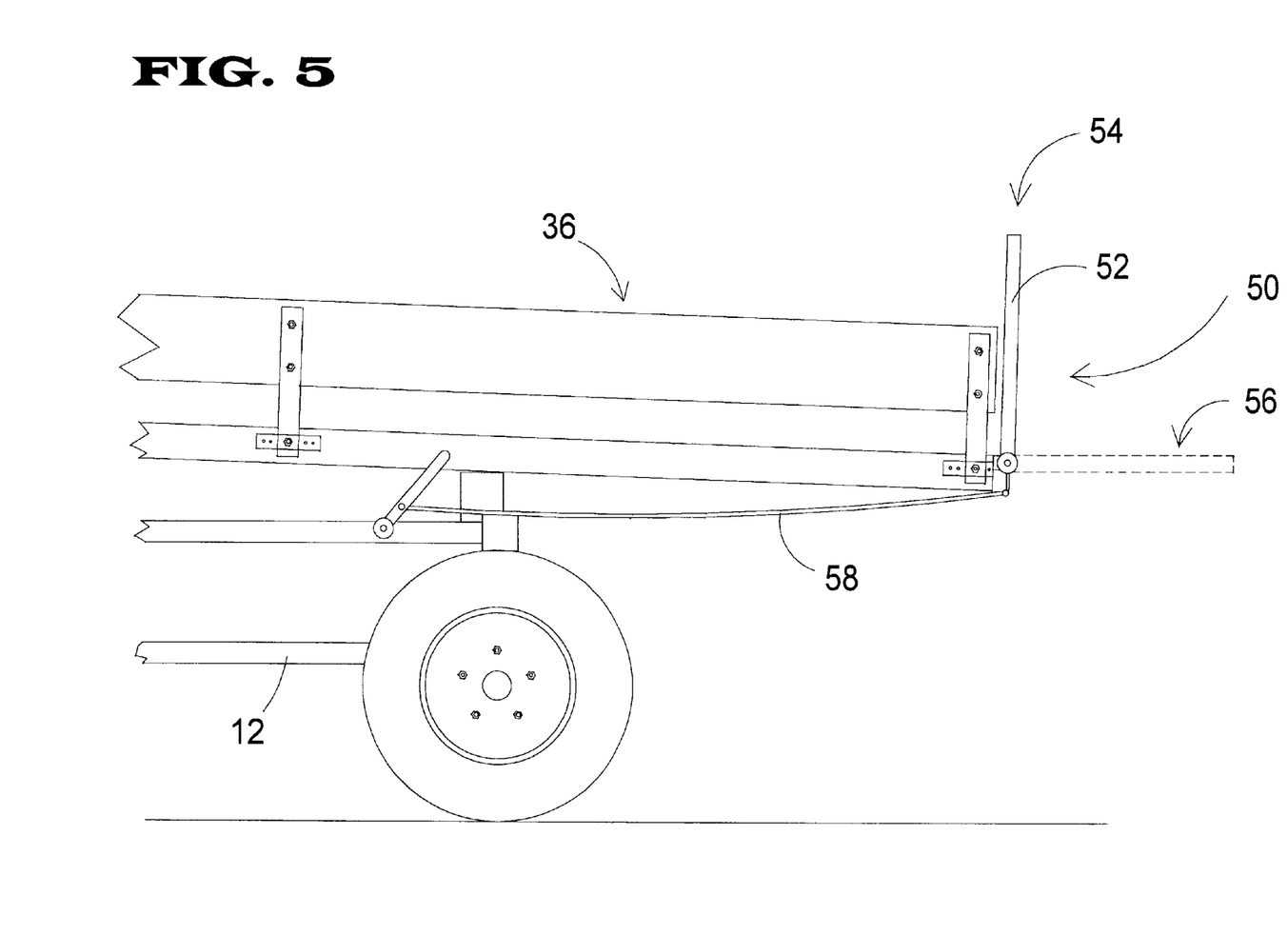
FIG. 5 is a schematic side view of a rearward portion of the present invention showing the bale unloading assembly.
Figure 6:
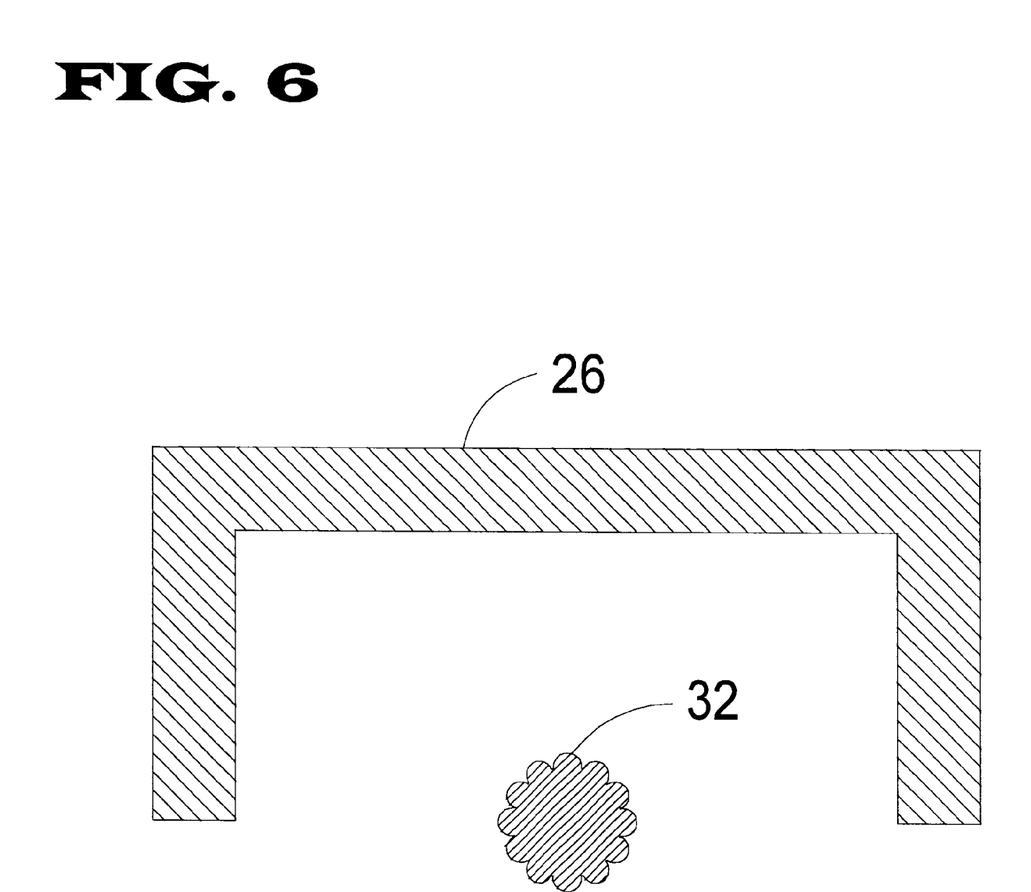
FIG. 6 is a schematic sectional view of the hitch assembly taken along line 6—6 of FIG. 1.

With reference now to the drawings, and in particular to FIGS. 1 through 6 thereof, a new bale transporting apparatus embodying the principles and concepts of the present invention and generally designated by the reference numeral 10 will be described.

As best illustrated in FIGS. 1 through 6, the bale transporting apparatus 10 generally comprises a frame 12, a hitch assembly 24 for facilitating towing of the frame, a bed assembly 36 for supporting bales being transported, a bale unloading assembly 50 for unloading bales from the bed assembly, and a bale loading assembly 60 for catching bales dispensed by a baler apparatus and lifting the bales onto the bed assembly.

The bale transporting apparatus 10 of the invention may be towed behind a prime mover such as, for example, a tractor, and is ideally suited for being towed behind a baler apparatus 2, particularly a baler apparatus that discharges completed bales 4 to the rear of the baler apparatus. In one suitable application of the invention, the bale transporting apparatus is towed behind a baler apparatus which is in turn towed behind a tractor. It should be understood that while the following description describes the invention in terms of use with a baler apparatus, the invention is equally useful with other prime movers or without a prime mover.

The bale transporting apparatus may include a frame 12 which has a front 14 and a rear 15. The frame 12 may comprise a longitudinal member 16 extending from the front to the rear of the frame, and having forward 18 and rearward 19 ends. The frame 12 may also include a forward cross member 20 mounted on the forward end of the longitudinal member, and a rear cross member 22 mounted on the rearward end of the longitudinal member.

The invention may also include a hitch assembly 24 mounted on the frame 12 for linking the frame to a baler apparatus for permitting towing of the frame. Significantly, the hitch assembly 24 may be collapsible for permitting a portion of the hitch assembly to lie substantially flat on the ground surface in a dropped position. The dropped position of the hitch assembly permits the loading of a bale onto the bale transporting apparatus, even while the hitch assembly remains attached to the baler apparatus. The hitch assembly may comprise a plurality of hitch links that are pivotally mounted together to permit pivot movement of the hitch links with respect to each other. The plurality of hitch links may include a forward link 26 and a rearward link 28. The plurality of hitch links may also include an intermediate link 30 positioned between the forward and rearward links.

The hitch assembly 24 may also include a biasing mechanism for biasing the hitch links out of the dropped position and toward a raised operational position in which the hitch assembly (and the bale transporting apparatus) may be actively towed. In the operational position, the links 26, 28, 30 are oriented substantially horizontal between the frame 12 and the apparatus behind which the apparatus 10 is being towed. The biasing mechanism may comprise a lifting spring 31 that is mounted on the frame and on one of the hitch links, such as the rearward link 28. In one embodiment of the invention, two or more lifting springs 31 are employed to bias the hitch links into the operational position. Additionally, the biasing mechanism may include a hitch cable 32 that extends substantially the length of the hitch assembly, such as from the front of the forward link 26 to the rearward link 28. A cable spring 33 may be mounted to and extend between a rear end of the hitch cable 32 and the frame 12 so that the cable spring applies tension to the hitch cable. The hitch cable 32 may be positioned below the hitch links such that downward movement of the hitch links presses the links against the hitch cable and tends to stretch the cable spring 33. In this manner, the hitch cable 32 and the cable spring 33 tends to resist movement of the hitch links into the dropped position, and tends to maintain the hitch links into the operational position. In one embodiment of the invention, one or more of the links of the hitch assembly have a groove or channel extending a bottom side of links (see FIG. 6) for receiving the hitch cable such as when the hitch links are moved downwardly from the operational position.

The invention also may include grazed engaging means mounted on the frame 12 for supporting the frame above a ground surface to thereby permit towing movement of the frame across the ground surface. The ground engaging means may comprise wheels 34 that are mounted on the frame 12.

The invention may also comprise a bed assembly 36 for holding collected bales thereon between loading and unloading of the bales. The bed assembly 36 may comprise a bed 38 that is mounted on the frame, and may be mounted on the frame in a manner permitting pivot movement of the bed 38 with respect to the frame 12. The bed 38 may have a pair of lateral sides 40 and a front 42 and rear 43. The front 42 of the bed 38 may be supported at an elevation above a ground surface that is greater than an elevation of the rear 43 of the bed such that bales loaded on the bed toward the front of the bed tend to move toward the rear of the bed, especially in the case of substantially cylindrically-shaped bales that are placed on the round side of the bale. The bed 39 may have an upper surface 44 for resting bales thereon. The upper surface 44 may be substantially planar, and may be a substantially continuous, solid surface or may comprise a mesh or grid surface. A plane of the upper surface 44 of the bed assembly may be angled with respect to a plane of the ground surface.

The bed assembly may also comprise a pair of laterally spaced side boards 46 for blocking sideward movement of bales off of the bed. Each side board 46 may be mounted on a side 40 of the bed and may extend upwardly with respect to the upper surface 44 of the bed 38. The bed assembly 36 may also include a hoist 48 for pivoting the bed with respect to the frame 12. The hoist being mounted on the frame and being connected to the bed 38.

A significant aspect of the invention is a bale unloading assembly 50 for unloading bales from the bed. The bale unloading assembly 50 may be mounted on the bed assembly, and may operate in conjunction with the hoist of the bed assembly. The bale unloading assembly may comprise a stop gate 52 mounted on the bed toward the rear of the bed for blocking rearward movement of a bale on the bed beyond the stop gate. The stop gate 52 may be pivotably mounted on the bed for such that the stop gate is pivotably moveable between a raised position 54 blocking bale movement past the stop gate and a lowered position 56 permitting bale movement past the stop gate. The raised position of the stop gate being characterized by the stop gate 52 being oriented substantially perpendicular to an upper surface of the bed and the lowered position being characterized by the stop gate being oriented substantially parallel to the upper surface of the bed. The stop gate may be mounted at the rear of the bed. The bale unloading assembly 50 may also include a stop gate linking member 58 that links the stop gate to the frame in a manner such that pivot movement of the bed upwardly moves the stop gate between the raised and lowered positions. The stop gate linking member 58 moves the stop gate from the raised to the lowered position when the bed is raised, and moves the stop gate from the lowered to the raised position when the bed is lowered.

Another significant aspect of the invention is a bale loading assembly 60 for loading a bale onto the bed. The bale loading assembly 60 may be mounted on the frame 12. The bale loading assembly may comprise a cradle 62 that extends forwardly from the frame 12. The cradle may be pivotally mounted on the frame 12. The cradle 62 may be pivotally movable between a lowered, loading position 64 adjacent to the ground surface and a raised, unloading position 66 adjacent to the bed. In one embodiment of the invention, the cradle comprises a cradle frame 68 having a front member 70, a rear member 72, and a pair of side members 74, 76 that extend between the front and rear members. The cradle 62 may also comprise a support frame 78 for supporting the cradle frame and permitting pivotal movement of the cradle frame with respect to the frame. The support frame connects the cradle frame 68 to the frame 12, and the support frame may comprise a plurality of arms that extend between the cradle frame and the frame.

The bale loading assembly 60 may also include an actuating assembly 80 for moving the cradle between the loading position and the unloading position. The actuating assembly 60 may comprise a hydraulic actuator 82 mounted on the frame 12 and on the cradle 62 such that extension and contraction of the hydraulic actuator raises and lowers the cradle with respect to the frame. The hydraulic actuator 82 may be adapted to be fluidly connected to a hydraulic pump through standardized hydraulic connections to, for example, a tractor pulling the baler apparatus and/or the invention.

In use, when the baler apparatus is ready to discharge a bale, the cradle of the bale loading apparatus is lowered into the loading position, which causes the cradle to press down on the links of the hitch assembly and the hitch links are thus moved downwardly from the operational position of the hitch assembly. The cradle is located in a relatively low position closely adjacent to the ground surface, the cradle is thus well positioned to catch the bale as it moves out of the baler apparatus and falls downwardly. Once the bale drops into the cradle, the cradle is raised by the actuating assembly and the bale rolls or falls out of the cradle onto the upper surface of the bed. Cylindrical bales roll backward on the inclined upper surface of the bed toward the rear of the bed. The bale rests against the stop gate, and remains adjacent to the stop gate until the front of the bed is raised and the stop gate is pivoted out of the raised, generally vertical orientation to a position that is generally parallel to the upper surface of the bed, and the bale is thus permitted to roll or move off of the upper surface of the bed.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A bale transporting apparatus comprising:
   a frame;
   ground engaging means mounted on the frame for supporting the frame above a ground surface and permitting movement of the frame across the ground surface;
   a bed assembly for holding collected bales thereon, the bed assembly including a bed mounted on the frame;
   a bale loading assembly for loading a bale onto the bed; and
   a hitch assembly mounted on the frame for linking the frame to a prime mover for towing, the hitch assembly being collapsible downwardly while the hitch assembly is linked to the prime mover when the bale loading assembly presses downwardly on the hitch assembly.

2. The apparatus of claim 1 wherein the bed of the bed assembly is mounted on the frame in a manner permitting pivot movement of the bed with respect to the frame.

3. The apparatus of claim 1 wherein a front of the bed of the bed assembly is supported at an elevation above a ground surface that is greater than an elevation of a rear of the bed such that bales loaded on the bed toward the front of the bed tend to move toward the rear of the bed.

4. The apparatus of claim 1 wherein the bed assembly includes a hoist for pivoting the bed with respect to the frame, the hoist being mounted on the frame and being connected to the bed.

5. The apparatus of claim 1 additionally comprising biasing means for biasing the hitch assembly upwards when the bale loading assembly stops pressing downwardly on the hitch assembly.

6. The apparatus of claim 1, wherein when the hitch assembly is collapsed downwardly, the hitch assembly lies substantially flat on the ground surface in a collapsed position.

7. The apparatus of claim 6 wherein the hitch assembly comprises a plurality of hitch links pivotally mounted together to permit pivot movement of the hitch links with respect to each other.

8. The apparatus of claim 1 wherein the bale unloading assembly includes a stop gate mounted on the bed at a rear of the bed for blocking rearward movement of a bale on the bed beyond the stop gate, the stop gate being pivotally mounted on the bed such that the stop gate is pivotably moveable between a raised position blocking bale movement past the stop gate and a lowered position permitting bale movement past the stop gate.

9. The apparatus of claim 8 wherein the bale unloading assembly includes a stop gate linking member linking the stop gate to the frame in a manner such that pivot movement of a front of the bed in an upward direction moves the stop gate between the raised and lowered positions.

10. The apparatus of claim 1 wherein the bale loading assembly includes a cradle extending forwardly from the frame, the cradle being pivotally mounted on the frame such that the cradle is pivotally movable between a lowered, loading position adjacent to the ground surface below the ground engaging means and a raised, unloading position adjacent to the bed.

11. The apparatus of claim 10 wherein the cradle comprises:
   a cradle frame;
   a support frame for supporting the cradle frame and permitting pivotal movement of the cradle frame with respect to the frame; and
   an actuating assembly for moving the cradle between the loading position and the unloading position.

12. The apparatus of claim 1 wherein the hitch assembly comprises a plurality of hitch links pivotally mounted together.

13. The apparatus of claim 12 wherein the hitch assembly comprises biasing means for biasing the hitch links out of a collapsed position.

14. A bale transporting apparatus comprising:
   a frame;
   ground engaging means mounted on the frame for supporting the frame above a ground surface and permitting movement of the frame across the ground surface;
   a bed assembly for holding collected bales thereon, the bed assembly including a bed mounted on the frame;
   a bale unloading assembly for unloading bales from the bed;
   a bale loading assembly for loading a bale onto the bed;
   a hitch assembly mounted on the frame for linking the frame to a prime mover to permit towing of the frame, the hitch assembly being collapsible for permitting a portion of the hitch assembly to lie substantially flat on the ground surface in a collapsed position;
   wherein the hitch assembly comprises a plurality of hitch links pivotally mounted together to permit pivot movement of the hitch links with respect to each other; and
   wherein the hitch assembly comprises biasing means for biasing the hitch links out of the collapsed position.

15. A bale transporting apparatus for towing behind a baler apparatus, the bale transporting apparatus comprising:

a frame;

ground engaging means mounted on the frame for supporting the frame above a ground surface and permitting movement of the frame across the ground surface;

a hitch assembly mounted on the frame for linking the frame to a prime mover to permit towing of the frame, the hitch assembly collapsible for permitting a portion of the hitch assembly to lie substantially flat on the ground surface in a collapsed position;

a bed assembly for holding collected bales thereon, the bed assembly including a bed mounted on the frame;

a bale unloading assembly for unloading bales from the bed, the bale unloading assembly including a stop gate mounted on the bed at a rear of the bed for blocking rearward movement of a bale on the bed beyond the stop gate, the stop gate being pivotally mounted on the bed such that the stop gate is pivotably moveable between a raised position blocking bale movement past the stop gate and a lowered position permitting bale movement past the stop gate; and a bale loading assembly for loading a bale onto the bed, the bale loading assembly including a cradle extending forwardly from the frame, the cradle being pivotally mounted on the frame such that the cradle is pivotally movable between a lowered, loading position adjacent to the ground surface below the ground engaging means and a raised, unloading position adjacent to the bed.

16. The apparatus of claim 15 wherein the bale unloading assembly includes a stop gate linking member linking the stop gate to the frame in a manner such that pivot movement of a front of the bed in an upward direction moves the stop gate between the raised and lowered positions.

17. The apparatus of claim 15 wherein the cradle comprises:

a cradle frame;

a support frame for supporting the cradle frame and permitting pivotal movement of the cradle frame with respect to the frame; and an actuating assembly for moving the cradle between the loading position and the unloading position.

18. The apparatus of claim 15 wherein the hitch assembly comprises a plurality of hitch links pivotally mounted together to permit pivot movement of the hitch links with respect to each other.

19. The apparatus of claim 17 wherein the hitch assembly comprises biasing means for biasing the hitch links out of the collapsed position.

20. A bale transporting apparatus for towing behind a baler apparatus, the bale transporting apparatus comprising:

a frame;

ground engaging means mounted on the frame for supporting the frame above a ground surface and permitting movement of the frame across the ground surface, the ground engaging means comprising wheels mounted on the frame;

a hitch assembly mounted on the frame for linking the frame to a prime mover to permit towing of the frame, the hitch assembly being collapsible for permitting a portion of the hitch assembly to lie substantially flat on the ground surface in a collapsed position, the hitch assembly comprising:

a plurality of hitch links pivotally mounted together to permit pivot movement of the hitch links with respect to each other, the plurality of hitch links including a forward link and a rearward link, the plurality of hitch links including an intermediate link positioned between the forward and rearward links;

biasing means for biasing the hitch links out of the collapsed position;

a bed assembly for holding collected bales thereon, the bed assembly comprising:

a bed mounted on the frame in a manner permitting pivot movement of the bed with respect to the frame, the bed having a pair of lateral sides and a front and rear, the front of the bed being supported at an elevation above the ground surface that is greater than an elevation of the rear of the bed such that bales loaded on the bed toward the front of the bed tend to move toward the rear of the bed, the bed having an upper surface for resting bales thereon;

a hoist for pivoting the bed with respect to the frame, the hoist being mounted on the frame and being connected to the bed;

a bale unloading assembly for unloading bales from the bed, the bale unloading assembly being mounted on the bed assembly, the bale unloading assembly comprising:

a stop gate mounted on the bed at the rear of the bed for blocking rearward movement of a bale on the bed beyond the stop gate, the stop gate being pivotally mounted on the bed such that the stop gate is pivotably moveable between a raised position blocking bale movement past the stop gate and a lowered position permitting bale movement past the stop gate, the raised position of the stop gate being characterized by the stop gate being oriented substantially perpendicular to an upper surface of the bed and the lowered position being characterized by the stop gate being oriented substantially parallel to the upper surface of the bed, the stop gate being mounted at the rear of the bed;

a stop gate linking member linking the stop gate to the frame in a manner such that pivot movement of the front of the bed upwardly-moves the stop gate between the raised and lowered positions;

a bale loading assembly for loading a bale onto the bed, the bale loading assembly being mounted on the frame, the bale loading assembly comprising:

a cradle extending forwardly from the frame, the cradle being pivotally mounted on the frame, the cradle being pivotally movable between a lowered, loading position adjacent to the ground surface and a raised, unloading position adjacent to the bed, the cradle comprising a cradle frame and a support frame for supporting the cradle frame and permitting pivotal movement of the cradle frame with respect to the frame; and an actuating assembly for moving the cradle between the loading position and the unloading position, the actuating assembly comprising a hydraulic actuator mounted on the frame and on the cradle such that extension and contraction of the hydraulic actuator raises and lowers the cradle with respect to the frame, the hydraulic actuator being adapted to be fluidly connected to a hydraulic pump.

* * * * *